United States Patent
Zhang et al.

(10) Patent No.: US 12,058,549 B2
(45) Date of Patent: Aug. 6, 2024

(54) SYSTEMS AND METHODS FOR UE COORDINATION BASED CSI FEEDBACK

(71) Applicant: APPLE INC., Cupertino, CA (US)

(72) Inventors: Yushu Zhang, Beijing (CN); Chunhai Yao, Beijing (CN); Chunxuan Ye, San Diego, CA (US); Dawei Zhang, Cupertino, CA (US); Haitong Sun, Cupertino, CA (US); Hong He, Cupertino, CA (US); Huaning Niu, Cupertino, CA (US); Wei Zeng, Cupertino, CA (US); Weidong Yang, San Diego, CA (US)

(73) Assignee: APPLE INC., Cupertino, CA (US)

( * ) Notice: Subject to any disclaimer, the term of this patent is extended or adjusted under 35 U.S.C. 154(b) by 431 days.

(21) Appl. No.: 17/593,257

(22) PCT Filed: Feb. 18, 2021

(86) PCT No.: PCT/CN2021/076747
§ 371 (c)(1),
(2) Date: Sep. 14, 2021

(87) PCT Pub. No.: WO2022/174372
PCT Pub. Date: Aug. 25, 2022

(65) Prior Publication Data
US 2023/0171627 A1     Jun. 1, 2023

(51) Int. Cl.
*H04W 24/10*  (2009.01)
*H04L 5/00*   (2006.01)

(52) U.S. Cl.
CPC .......... *H04W 24/10* (2013.01); *H04L 5/0048* (2013.01)

(58) Field of Classification Search
CPC ............................ H04W 24/10; H04L 5/0057
See application file for complete search history.

(56) References Cited

U.S. PATENT DOCUMENTS

| | | | |
|---|---|---|---|
| 2021/0243761 A1* | 8/2021 | Yoshioka | H04W 72/53 |
| 2022/0225143 A1* | 7/2022 | Sun | H04W 72/542 |
| 2022/0264557 A1* | 8/2022 | Liu | H04L 5/0094 |

FOREIGN PATENT DOCUMENTS

| | | |
|---|---|---|
| CN | 103391127 A | 11/2013 |
| CN | 107534888 A | 1/2018 |
| EP | 3079382 A1 | 10/2016 |
| EP | 3605868 A2 | 2/2020 |

OTHER PUBLICATIONS

PCT/CN2021/076747, International Search Report and Written Opinion, Oct. 26, 2021, 9 pages.

* cited by examiner

*Primary Examiner* — Bo Hui A Zhu
(74) *Attorney, Agent, or Firm* — Dorsey & Whitney LLP

(57) ABSTRACT

Systems and methods provide user equipment (UE) coordinated channel state information (CSI) measurement and reporting. One or both of a first UE and a second UE may perform CSI measurement, but only the first UE sends a CSI report to a base station.

19 Claims, 10 Drawing Sheets

SYSTEMS AND METHODS FOR UE COORDINATION BASED CSI FEEDBACK

TECHNICAL FIELD

This application relates generally to wireless communication systems, including channel state information (CSI) feedback.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

In certain wireless systems (e.g., 3GPP Release (Rel)-15 or Rel-16), a UE performs CSI measurement and report independently from measurement and reporting performed by other UEs. In such systems, each UE may separately perform CSI measurement and reporting. A base station, such as a gNB, may configure a UE to measure CSI based on CSI reference signal (CSI-RS) resources and can configure the UE to report, for example, a CSI-RS resource indicator (CRI), a rank indicator (RI), a precoding matrix indicator (PMI), a layer indicator (LI), and/or a channel quality indicator (CQI). See, e.g., CSI-reportConfig in 3GPP Technical Specification (TS) 38.331, section 6.3.2.

The CRI is used to select the beam index. The RI is used to indicate the number of layers. The PMI is used to report transmission direction for the corresponding rank. The LI is to report the strongest layers based on the reported RI and/or PMI. In certain implementations, the LI is not reported if the reported rank is 1. The CQI is used to report the channel quality based on the reported CRI, RI, and/or PMI. In certain implementations, if rank is above 4, the UE reports CQI for each codeword.

Figure 1:
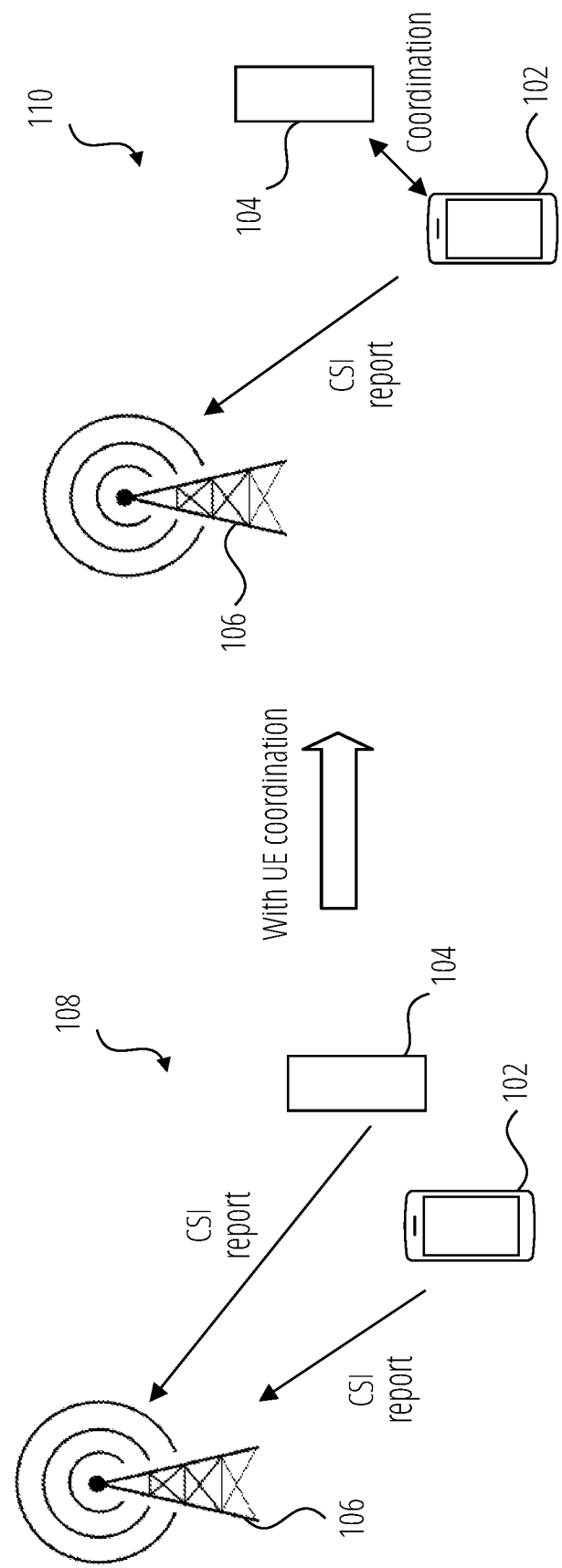
FIG. 1 illustrates an example of a first UE, a second UE, and a base station that may be configured in accordance with certain embodiments.

In certain use cases, it is possible that some UEs can share similar CSI properties when the UEs are in a similar locations and/or there is some coordination between the UEs. For example, FIG. 1 illustrates a first UE 102 (e.g., a smart phone), a second UE 104 (e.g., a wearable device such as a smart watch or fitness tracker), and a base station 106 (e.g., a gNB). In a first scenario 108, the first UE 102 and the second UE 104 may be used in close proximity to one another but without coordinating CSI measurement or reporting. Thus, as shown in the first scenario 108, both the first UE 102 and the second UE 104 may each separately measure CSI and send separate CSI reports to the wireless network through the base station 106. A second scenario 110 includes UE coordination wherein the first UE 102 and the second UE 104 are configured to coordinate with one another to communicate with the wireless network through the base station 106. Although not shown in FIG. 1, the coordination is not limited to two UEs and may include any number of UEs configured to communicate with one another in a coordination group. However, to independently perform the CSI measurement and reporting for UEs with coordination may waste power for the UEs and may increase system overhead.

Thus, embodiments disclosed herein provide systems and methods for UE coordinated CSI measurement and report, including UE coordination based CSI measurement and/or UE coordination based CSI report. In one embodiment, as illustrated in the second scenario 110 in FIG. 1, one or both of the first UE 102 and the second UE 104 may perform CSI measurement but only the first UE 102 sends a CSI report to the base station 106.

In certain embodiments, different modes may be used for UE coordination based CSI measurement and report. In a first mode (Mode 1), each UE within a coordination group can perform CSI measurement and one of the UEs can report the CSI for each UE in the coordination group. In a second mode (Mode 2), only one UE performs CSI measurement and report for UEs within a coordination group. Referring again to FIG. 1, the first UE 102 may report the supported mode (i.e., Mode 1 or Mode 2) to the base station 106 and the base station 106 can configure the mode by higher layer signaling. As discussed below, the measured CSI may be different if the UEs include a different number of antennas, e.g. a first UE with four receive (Rx) antennas and a second UE with two Rx antennas.

Mode 1

In certain embodiments, when the base station (e.g., gNB) receives an indication that a UE or a group of UEs in a coordination group prefers to use Mode 1, the base station may configure each UE within the coordination group with CSI report configuration information. The CSI report configuration information may be represented by one or multiple CSI-ReportConfig information element (IE) for each UE within the coordination group. With the CSI-ReportConfig IE, the UE can identify, for example, the resources for CSI measurement, the report quality (whether to report wideband or subband CQI/PMI, etc.), a report configuration type (e.g., periodic, aperiodic or semi-persistent), and the kind of quantity (e.g, synchronization signal block (SSB) reference signal received power (RSRP), CQI, PMI, RI, etc.) that should be measured and reported, among other parameters.

In one embodiment, the base station may trigger the UE to report CSI for one or multiple CSI-reportConfig IE, where some CSI-reportConfig IE may correspond to other UEs within the coordination group. In control signaling to trigger a CSI report, the base station may provide a UE identifier (ID) (e.g., C-RNTI), as well as a CSI-reportConfig ID. When the UE reports the CSI for multiple CSI-reportConfig IEs, the reported CSI may be multiplexed based on the UE ID and the CSI-reportConfig ID. In one non-limiting example, the reporting format could be as follows: {CSI for UE ID 1, CSI-reportConfig ID 1}, {CSI for UE ID 1, CSI-reportConfig ID 2}, . . . , {CSI for UE ID 2, CSI-reportConfig ID 1}, . . . .

In another embodiment, in a CSI-reportConfig IE, the base station may provide the UE ID, and in the CSI report triggering signaling the base station only provides CSI-reportConfig ID (i.e., without resending the UE ID in the CSI report triggering signaling).

By way of example, a CSI report may be triggered by radio resource control (RRC) signaling, media access control (MAC) control element (CE), or downlink control information (DCI). The triggering signaling may be transmitted to a first UE only, or to the first UE and a second UE separately, or to the first UE and the second UE in a group based manner.

Figure 2:
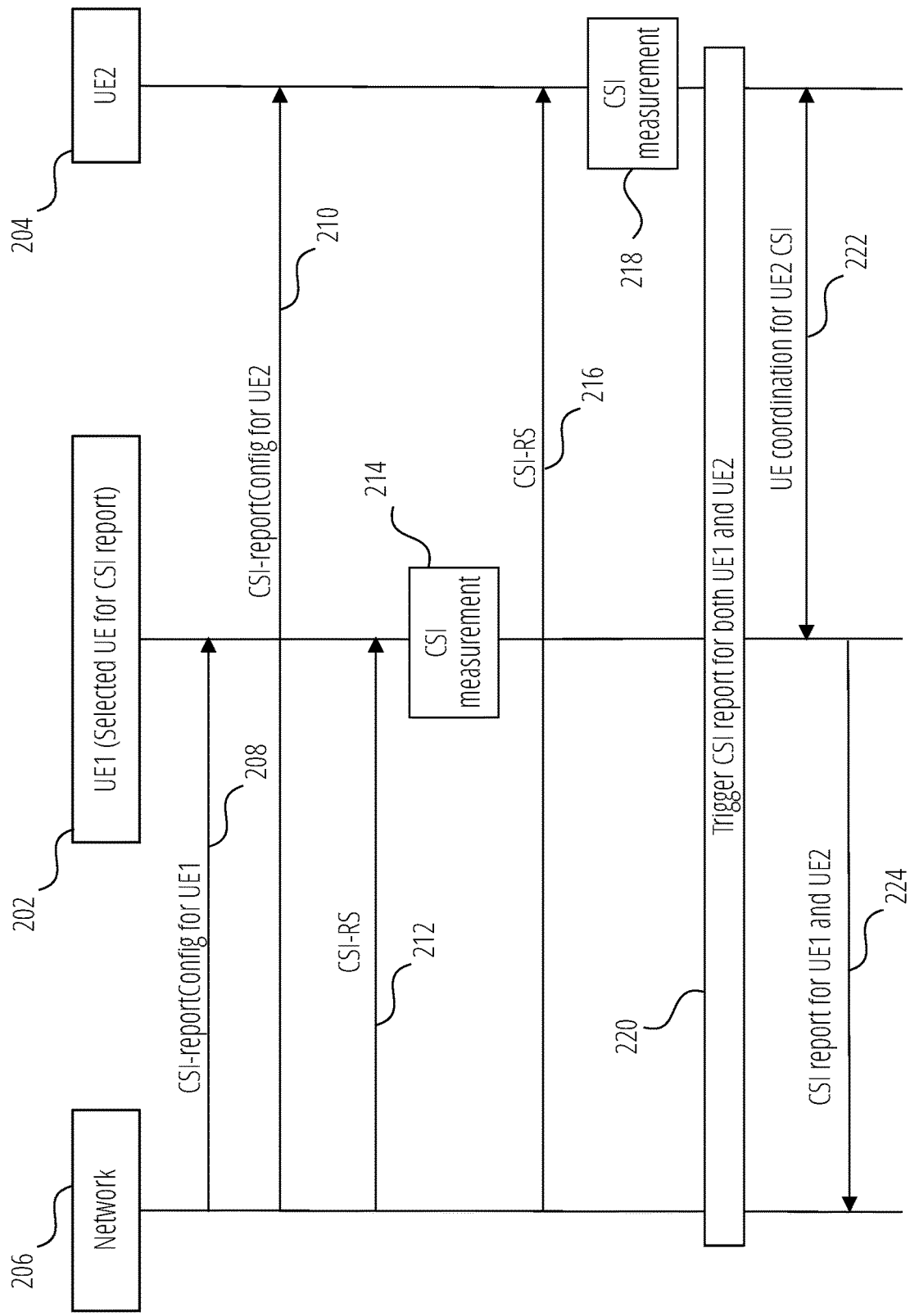
FIG. 2 illustrates a procedure for a first mode (Mode 1) for UE coordination based CSI feedback in accordance with one embodiment.

FIG. 2 illustrates a procedure for a first mode (Mode 1) for UE coordination based CSI feedback according to one embodiment. In this example, a first UE 202 (UE1) and a second UE 204 (UE2) may be configured to coordinate with one another to communicate with a wireless network 206 (e.g., via the base station 106 as shown in FIG. 1). Other UEs (not shown) may be in a coordination group with the first UE 202 and the second UE 204. The first UE 202 is a selected UE by the wireless network 206 to provide CSI reports for the coordination group. The minimal delay for a CSI report may consider a minimal UE coordination delay, which can be reported by the first UE 202. If the CSI report includes CSI from other UEs in the coordination group, the minimal delay may be calculated based on normal CSI processing delay plus UE coordination delay.

The wireless network 206 sends a CSI-reportConfig IE 208 for UE1 to the first UE 202 and a CSI-reportConfig IE 210 for UE2 to the second UE 204. The wireless network 206 transmits CSI-RS 212 to the first UE 202, which performs CSI measurement 214 on the CSI-RS 212. The wireless network 206 also transmits CSI-RS 216 to the second UE 204, which performs CSI measurement 218 on the CSI-RS 216. In certain embodiments, the CSI-RS 212 and the CSI-RS 216 may include the same CSI-RS resources. The wireless network 206 then triggers 220 a CSI report for both the first UE 202 and the second UE 204. In response, the first UE 202 and the second UE 204 perform UE coordination 222 to communicate CSI measurement information from the second UE 204 to the first UE 202. With CSI measurement information obtained from its own measurement and with the CSI measurement information from the second UE 204, the first UE 202 generates and sends a CSI report 224 for both the first UE 202 and the second UE 204 to the wireless network 206.

Mode 2

In Mode 2, according to certain embodiments, only one UE performs CSI measurement and report for UEs within a coordination group. With regard to a different number of Rx antennas in different UEs within the coordination group, a base station (e.g., gNB) may trigger a selected UE to report CSI for UEs with different numbers of Rx antennas. The number of Rx antennas may be determined by a maximum number of downlink (DL) layers reported by a UE, which implies how many Rx antennas the UE has. In certain embodiments, the selected UE (i.e., selected by the base station to send the CSI report) has the maximum number of Rx antennas among the UEs within the coordination group.

In one embodiment, the base station configures the UE IDs for the coordination group in a CSI-reportConfig IE. The selected UE may report the measured CSI for each UE in the coordination group based on the CSI-RS resources configured in the CSI-reportConfig IE. The reported CSI for a UE may be based on the Rx antenna property for each UE. Further, a rank restriction may be configured per UE ID within the CSI-reportConfig IE because different numbers of Rx antennas have different ranks (different number of layers).

Figure 3:
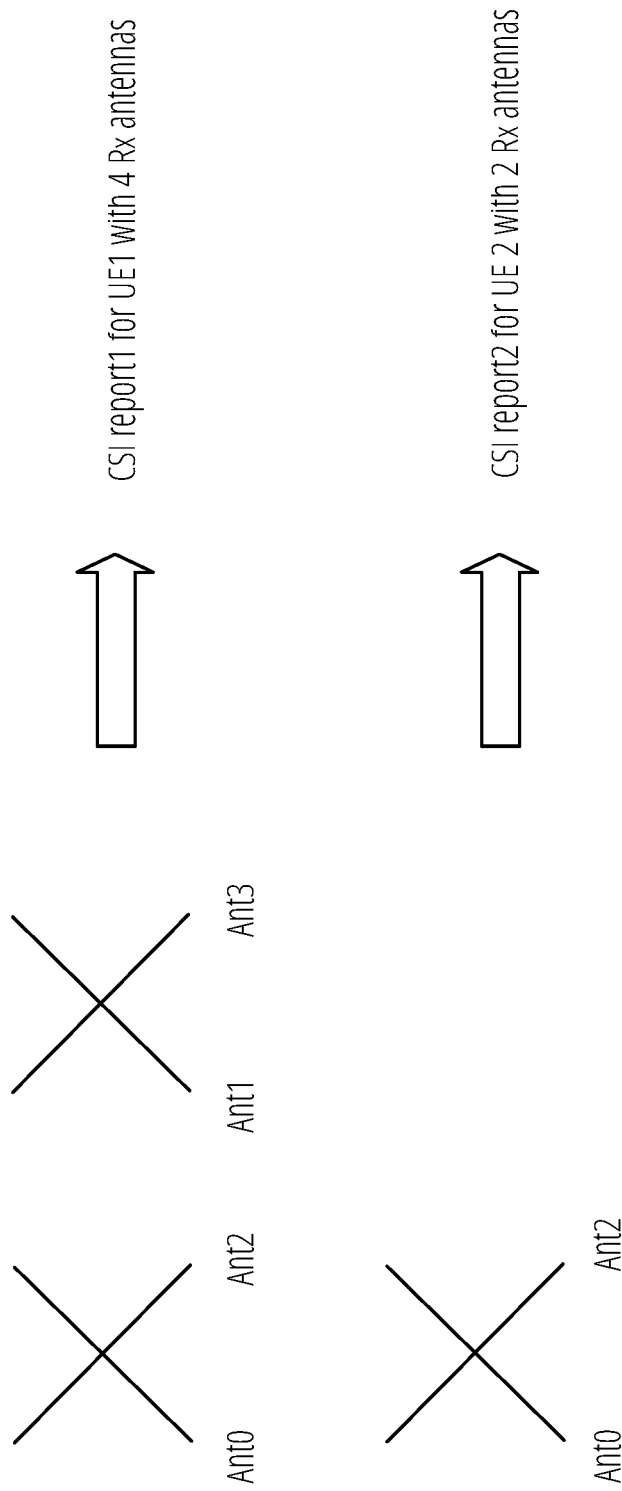
FIG. 3 illustrates four antennas (Ant0, Ant1, Ant2, Ant3) of a selected UE (UE1) in accordance with one embodiment.

For UEs with the same number of antenna as the selected UE, the same CSI indication can be reported. For example, FIG. 3 illustrates four antennas (Ant0, Ant1, Ant2, Ant3) of a selected UE (UE1) according to one embodiment. The selected UE may generate a first CSI report (CSI report1) for UE1 with four Rx antennas (i.e., for the selected UE and other UEs in the coordination group with four antennas). For one or more other UEs in the coordination group with a smaller number of antennas, the selected UE may send a second CSI report based on measurements using the corresponding number of antennas. For example, as shown in FIG. 3, the selected UE may use two of its Rx antennas (in this example Ant0 and Ant2) to perform CSI measurement and to generate a second CSI report (CSI report2) for a second UE (UE2) with two Rx antennas. Instead of using Ant0 and Ant2, as shown in this example, the selected UE could report the CSI for UE2 using a different subset of antennas (e.g., Ant1 and Ant3). In one embodiment, the selected UE reports the CSI for UE2 (with the fewer number of Rx antennas) based on a fixed or predetermined subset of antennas, a UE selected subset of antennas, or a subset of antennas indicated by the base station. In another embodiment, the selected UE reports the CSI for UE2 (with the fewer number of Rx antennas) based on a best or worst subset of antennas (e.g., a subset of the antennas with a best CQI or a worst CQI measured by the selected UE).

In another embodiment, the base station configures one or multiple maximum number of DL layers in a CSI-reportConfig IE. The maximum number of DL layers implies the number of Rx antennas. The rank restriction can be configured per maximum number of DL layers. The selected UE reports CSI for each configured maximum number of DL layers. For a second UE in the coordination group with a smaller maximum number of DL layers than that of the selected UE, the selected UE may report the CSI for the second UE based on a fixed or predetermined subset of antennas, a UE selected subset of antennas, or a subset of antennas indicated by the base station. In another embodiment, the selected UE reports the CSI for the second UE based on a best or worst subset of antennas (e.g., a subset of the antennas with a best CQI or a worst CQI measured by the selected UE).

In another embodiment, the base station configures whether a CSI-reportConfig IE is used for one UE or multiple UEs within a coordination group. If the CSI-reportConfig IE is for multiple UEs within the coordination group, the selected UE reports the CSI for UEs with different capability of maximum number of DL layers. The rank restriction can be configured per maximum number of DL layers. The selected UE reports CSI for each configured maximum number of DL layers. For a second UE in the coordination group with a smaller maximum number of DL layers than that of the selected UE, the selected UE may report the CSI for the second UE based on a fixed or predetermined subset of antennas, a UE selected subset of antennas, or a subset of antennas indicated by the base station. In another embodiment, the selected UE reports the CSI for the second UE based on a best or worst subset of antennas (e.g., a subset of the antennas with a best CQI or a worst CQI measured by the selected UE).

In certain embodiments, whether the base station configures the UE IDs for the coordination group in single CSI-reportConfig IE or configures one or multiple maximum number of DL layers in single CSI-reportConfig IE, the selected UE can report the CSI by physical uplink control channel (PUCCH) or physical uplink shared channel (PUSCH).

In one embodiment, if the CSI is reported by short PUCCH, the CSI may be multiplexed per UE (e.g., according to CRI/RI/PMI/CQI/LI for UE1, CRI/RI/PMI/CQI/LI for UE2, . . . ). In another embodiment, if the CSI is reported by short PUCCH, the CSI may be multiplexed per CSI quantity per UE (e.g., according to CRI for UE1, CRI for UE2, . . . , RI for UE1, RI for UE2, . . . , PMI1 for UE1, PMI1 for UE2, . . . ).

If the CSI is reported by long PUCCH or PUSCH, the CSI may be divided into two parts (see, e.g., 3GPP TS 38.212, section 6.3.2.1.2). In one embodiment, the first CSI part may include the CRI/RI/CQI for the first codeword for current reported UE, and the second CSI part may include other information for all UEs in the coordination group. In another embodiment, the first CSI part may include the CRI/RI/CQI for the first codeword for each UE, and the second CSI part may include other information for each UE in the coordination group.

Figure 4:
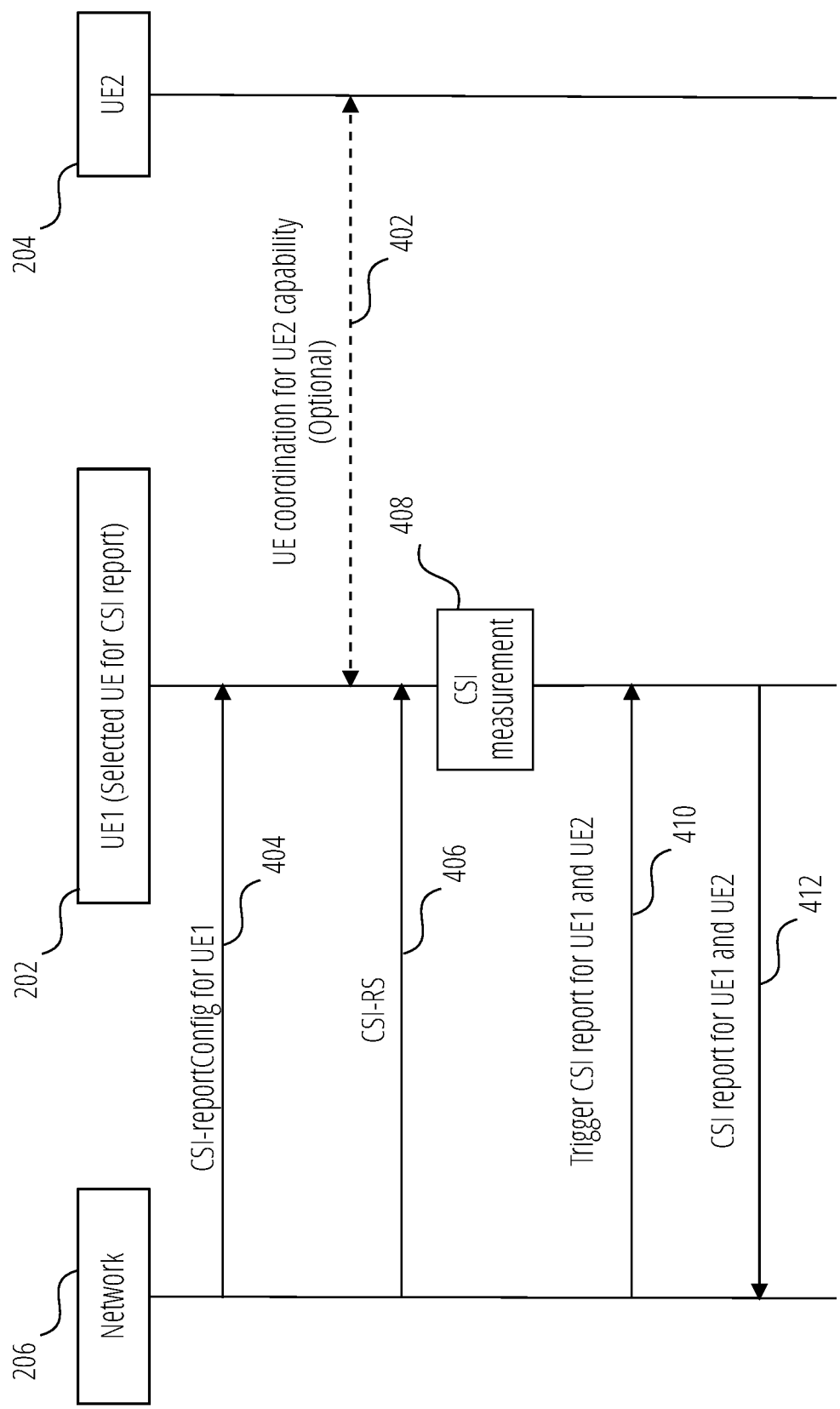
FIG. 4 illustrates a procedure for a second mode (Mode 2) for UE coordination based CSI feedback in accordance with one embodiment.

FIG. 4 illustrates a procedure for a second mode (Mode 2) for UE coordination based CSI feedback according to one embodiment. In this example, the first UE 202 (UE1) and the second UE 204 (UE2) may be configured to coordinate with one another to communicate with the wireless network 206 (e.g., via the base station 106 as shown in FIG. 1). Other UEs (not shown) may be in a coordination group with the first UE 202 and the second UE 204. The first UE 202 is a selected UE by the wireless network 206 to provide CSI reports for the coordination group. In this example, UE coordination on UE2 capability 402 is optional. For example, if the wireless network 206 provides an indication of a maximum number of layers, as discussed above, the UE coordination for UE2 capability 402 may not be necessary.

The wireless network 206 sends a CSI-reportConfig IE 404 for UE1 to the first UE 202. The wireless network 206 also transmits CSI-RS 406 to the first UE 202. The first UE 202 performs CSI measurement 408 on the CSI-RS 406. The wireless network 206 then triggers 410 a CSI report for both the first UE 202 and the second UE 204. In response, the first UE 202 generates and sends a CSI report 412 for both the first UE 202 and the second UE 204 to the wireless network 206.

Figure 5:
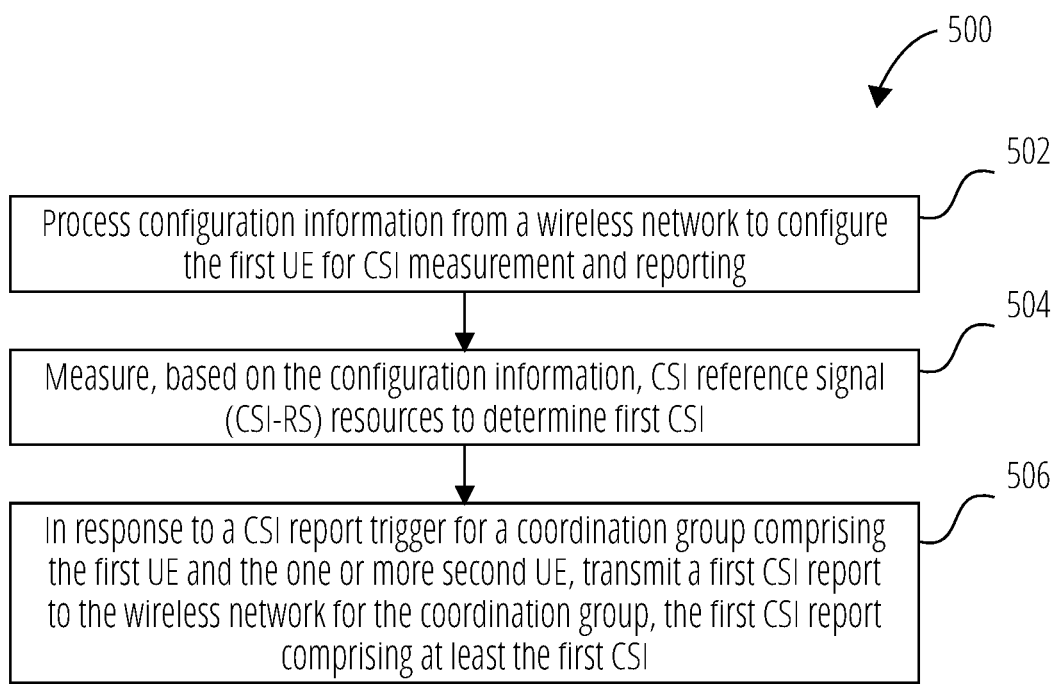
FIG. 5 illustrates a flowchart of a method for a first UE (e.g., a selected UE) to perform CSI feedback in coordination with one or more second UE in accordance with one embodiment.

FIG. 5 illustrates a flowchart of a method 500 for a first UE (e.g., a selected UE) to perform CSI feedback in coordination with one or more second UE according to one embodiment. In block 502, the method 500 includes processing configuration information from a wireless network to configure the first UE for CSI measurement and reporting. In block 504, the method 500 includes measuring, based on the configuration information, CSI reference signal (CSI-RS) resources to determine first CSI. In block 506, in response to a CSI report trigger for a coordination group comprising the first UE and the one or more second UE, the method 500 includes transmitting a first CSI report to the wireless network for the coordination group, the first CSI report comprising at least the first CSI.

In certain embodiments, the method 500 further comprises sending a message to the wireless network indicating a supported mode for UE coordination based CSI feedback, wherein in a first mode both the first UE and the one or more second UE perform CSI measurements to be reported by the first UE, and wherein in a second mode only the first UE performs the CSI measurements to be reported by the first UE.

In certain embodiments, the method 500 further comprises coordinating with the one or more second UE to receive second CSI from the one or more second UE in the coordination group, wherein the first CSI report comprises the first CSI for the first UE and the second CSI for the one or more second UE.

In certain embodiments of the method 500, the CSI report trigger corresponds to one or more CSI report configuration information element (CSI-reportConfig IE) associated with at least one of the first UE and the one or more second UE. In certain such embodiments, control signaling from the wireless network for the CSI report trigger comprises a UE identifier (ID) and a CSI-reportConfig ID for each of the one or more CSI-reportConfig IE to be reported. In such embodiments, the method 500 may further include multiplexing the first CSI and the second CSI in the first CSI report based on the UE ID and the CSI-reportConfig ID. In other embodiments, each of the one or more CSI-reportConfig IE comprises a UE identifier (ID), wherein control signaling from the wireless network for the CSI report trigger comprises a CSI-reportConfig ID for each of the one or more CSI-reportConfig IE to be reported.

In certain embodiments of the method 500, the CSI report trigger comprises a radio resource control (RRC) signal, a media access control (MAC) control element (CE), or downlink control information (DCI) transmitted to the first UE, transmitted separately to the first UE and the one or more second UE, or transmitted to the first UE and the one or more second UE in a group based manner.

In certain embodiments of the method 500, the first UE comprises a maximum number of receive (Rx) antennas for the coordination group. The configuration information may include a CSI report configuration information element (CSI-reportConfig IE) comprising UE identifiers (IDs) for each of the first UE and the one or more second UE, wherein a rank restriction is configured per UE, wherein the first CSI is based on measuring the CSI-RS resources by the first UE using the maximum number of Rx antennas, and wherein the first CSI report comprises the first CSI for the first UE and any of the one or more second UE comprising the maximum number of Rx antennas. In certain such embodiments, the method 500 further includes: determining, by the first UE, a second CSI based on measuring the CSI-RS resources using a subset of Rx antennas that is less than the maximum number of Rx antennas; and transmitting a second CSI report to the wireless network comprising the second CSI for at least one of the one or more second UE comprising a number of Rx antennas corresponding to the subset of Rx antennas. The subset of Rx antennas may include a predetermined subset of Rx antennas of the first UE, a selected subset of Rx antennas of the first UE determined by the first UE, or an indicated subset of Rx antennas determined by the wireless network. Alternatively, the subset of Rx antennas comprises a best subset of Rx antennas or a worst subset of Rx antennas as measured by the first UE.

In certain embodiments of the method 500, the configuration information comprises a CSI report configuration information element (CSI-reportConfig IE) indicating one or more maximum number of downlink (DL) layers for reporting, wherein the maximum number of DL layers implies a number of Rx antennas per UE, and wherein a rank restriction is configured per the maximum number of DL layers. The method 500 may further include reporting the first CSI for a first maximum number of DL layers and a second CSI for a second maximum number of DL layers. The second maximum number of DL layers corresponds to a predetermined subset of Rx antennas of the first UE, a selected subset of Rx antennas of the first UE determined by the first UE, or an indicated subset of Rx antennas of the first UE determined by the wireless network. Alternatively, the second maximum number of DL layers corresponds to a best subset of Rx antennas or a worst subset of Rx antennas as measured by the first UE.

In certain embodiments of the method 500, the configuration information comprises a CSI report configuration information element (CSI-reportConfig IE) configured for a single UE or for multiple UEs in the coordination group, wherein a rank restriction is configured per a maximum number of DL layers. The method 500 may further include reporting the first CSI for a first maximum number of DL layers and a second CSI for a second maximum number of DL layers. The second maximum number of DL layers may correspond to a predetermined subset of Rx antennas of the first UE, a selected subset of Rx antennas of the first UE determined by the first UE, or an indicated subset of Rx antennas of the first UE determined by the wireless network. Alternatively, the second maximum number of DL layers corresponds to a best subset of Rx antennas or a worst subset of Rx antennas as measured by the first UE.

In certain embodiments of the method 500, the first CSI report or a second CSI report is reported using a short physical uplink control channel (PUCCH), and wherein the first CSI or a second CSI is multiplexed per UE or per CSI quantity per UE.

In certain embodiments of the method 500, the first CSI report or a second CSI report is reported using a long physical uplink control channel (PUCCH) or physical uplink shared channel (PUSCH), and wherein the first CSI or a second CSI is divided into two parts. A first CSI part may include one or more of a CSI-RS resource indicator (CRI), a rank indicator (RI), and a channel quality indicator (CQI) for a first codeword for a current reported UE, and wherein a second CSI part includes other CSI quantities for the first UE and the one or more second UEs in the coordination group. Alternatively, a first CSI part may include one or more of a CSI-RS resource indicator (CRI), a rank indicator (RI), and a channel quality indicator (CQI) for a first codeword for each of the first UE and the one or more second UEs in the coordination group, and wherein a second CSI part includes other CSI quantities for each of the first UE and the one or more second UEs in the coordination group.

Figure 6:
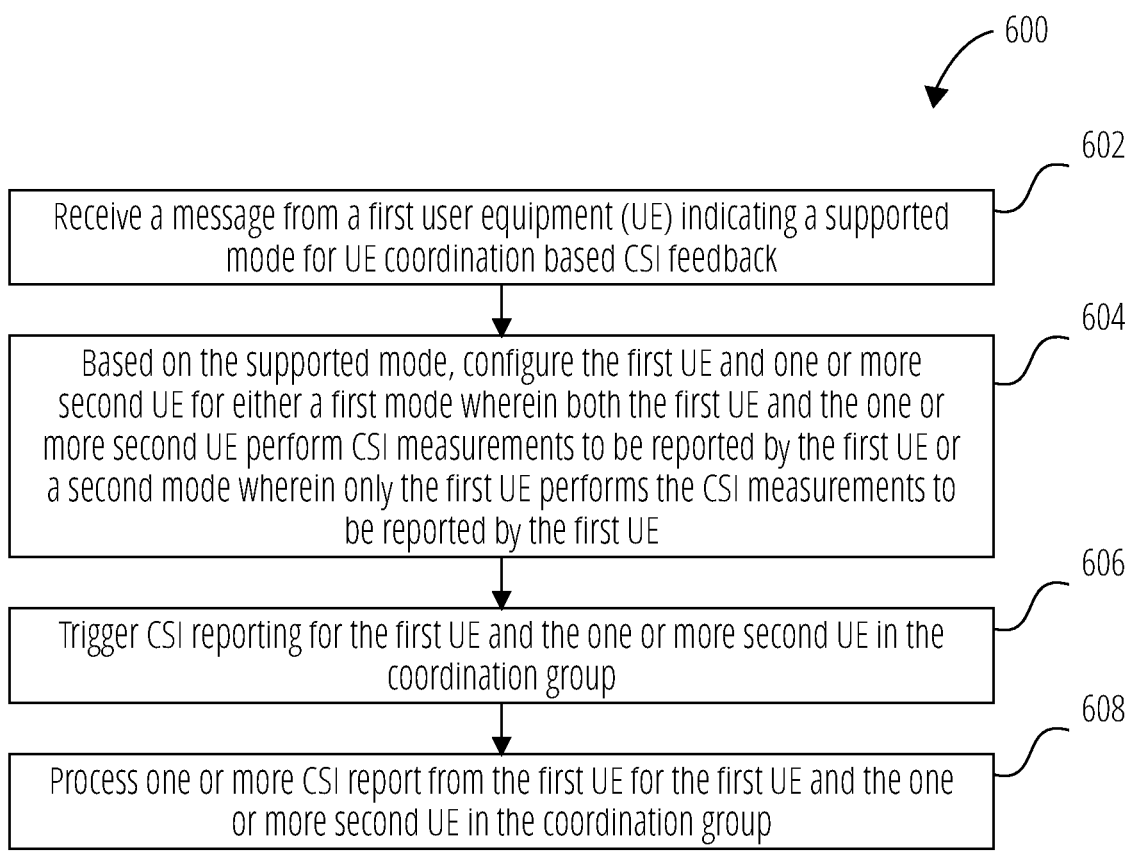
FIG. 6 illustrates a flowchart of a method for a base station in a wireless network in accordance with one embodiment.

FIG. 6 illustrates a flowchart of a method 600 for a base station in a wireless network according to one embodiment. In block 602, the method 600 includes receiving a message from a first user equipment (UE) indicating a supported mode for UE coordination based CSI feedback. In block 604, based on the supported mode, the method 600 includes configuring the first UE and one or more second UE for either a first mode wherein both the first UE and the one or more second UE perform CSI measurements to be reported by the first UE or a second mode wherein only the first UE performs the CSI measurements to be reported by the first UE. In block 606, the method 600 includes triggering CSI reporting for the first UE and the one or more second UE in the coordination group. In block 608, the method 600 includes processing one or more CSI report from the first UE for the first UE and the one or more second UE in the coordination group.

For the first mode, certain embodiments of the method 600 further include: configuring one or more CSI report configuration information element (CSI-reportConfig IE) for each of the first UE and the one or more second UE within the coordination group; and triggering the first UE to report for CSI for selected ones of the one or more CSI-reportConfig IE. Control signaling to trigger the first UE to report the CSI may include a UE identifier (ID) and a CSI-reportConfig ID for each of the one or more CSI-reportConfig IE to be reported. Alternatively, each of the one or more CSI-reportConfig IE may include a UE identifier (ID), and control signaling to trigger the first UE to report the CSI may include a CSI-reportConfig ID for each of the one or more CSI-reportConfig IE to be reported.

In certain embodiments of the method 600, triggering the CSI reporting comprises generating a radio resource control (RRC) signal, a media access control (MAC) control element (CE), or downlink control information (DCI) to transmit to the first UE, to transmit separately to the first UE and the one or more second UE, or to transmit to the first UE and the one or more second UE in a group based manner.

In certain embodiments of the method 600, triggering the CSI reporting comprises triggering the UE to report the CSI for the first UE and the one or more second UE comprising different numbers of receive (Rx) antennas. The different numbers of Rx antennas may be determined by a maximum number of downlink (DL) layers reported by each of the first UE and the one or more second UE of the coordination group. The method 600 may further include selecting the first UE to transmit the one or more CSI report based on determining that the first UE comprises a maximum number of Rx antennas for the coordination group. In certain such embodiments, the method 600 further includes: configuring UE identifiers (IDs) in a CSI report configuration information element (CSI-reportConfig IE); configuring CSI reference signal (CSI-RS) resources in the CSI-report Config IE; configuring a rank restriction per UE; receiving a first CSI report from the first UE corresponding to the maximum number of Rx antennas; and receiving a second CSI report from the first UE corresponding a smaller number of Rx antennas than the maximum number of Rx antennas.

In certain embodiments, the method 600 further includes: configuring one or more maximum number of downlink (DL) layers in a CSI report configuration information element (CSI-reportConfig IE), wherein the maximum number of DL layers implies a number of Rx antennas per UE in the coordination group; configuring a rank restriction per the maximum number of DL layers; and receiving a separate CSI report for each configured maximum number of DL layers.

In certain embodiments, the method 600 further includes: configuring whether a CSI report configuration information element (CSI-reportConfig IE) is to be used for a single UE or multiple UEs within the coordination group; configuring a rank restriction per a maximum number of downlink (DL) layers; and receiving a separate CSI report for each configured maximum number of DL layers.

Figure 7:
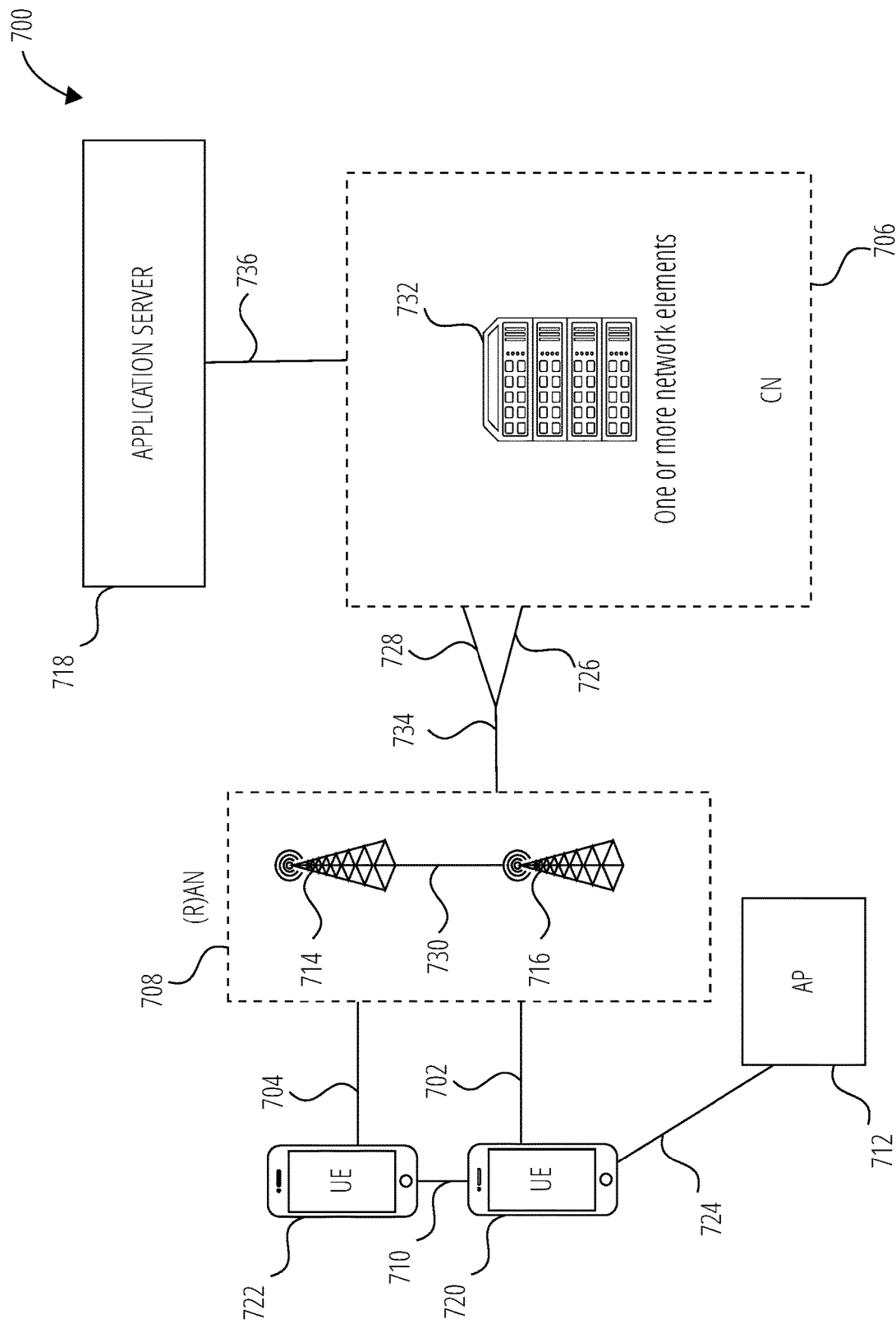
FIG. 7 illustrates a system in accordance with one embodiment.

FIG. 7 illustrates an example architecture of a system 700 of a network, in accordance with various embodiments. The following description is provided for an example system 700 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 7, the system 700 includes UE 722 and UE 720. In this example, the UE 722 and the UE 720 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 722 and/or the UE 720 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 722 and UE 720 may be configured to connect, for example, communicatively couple, with an access node or radio access node (shown as (R)AN 708). In embodiments, the (R)AN 708 may be an NG RAN or a 5G RAN, an E-UTRAN, or a legacy RAN, such as a UTRAN or GERAN. As used herein, the term "NG RAN" or the like may refer to a (R)AN 708 that operates in an NR or 5G system, and the term "E-UTRAN" or the like may refer to a (R)AN 708 that operates in an LTE or 4G system. The UE 722 and UE 720 utilize connections (or channels) (shown as connection 704 and connection 702, respectively), each of which comprises a physical communications interface or layer (discussed in further detail below).

In this example, the connection 704 and connection 702 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UE 722 and UE 720 may directly exchange communication data via a ProSe interface 710. The ProSe interface 710 may alternatively be referred to as a sidelink (SL) interface and may comprise one or more logical channels, including but not limited to a PSCCH, a PSSCH, a PSDCH, and a PSBCH.

The UE 720 is shown to be configured to access an AP 712 (also referred to as "WLAN node," "WLAN," "WLAN Termination," "WT" or the like) via connection 724. The connection 724 can comprise a local wireless connection, such as a connection consistent with any IEEE 802.11 protocol, wherein the AP 712 would comprise a wireless fidelity (Wi-Fi®) router. In this example, the AP 712 may be connected to the Internet without connecting to the core network of the wireless system (described in further detail below). In various embodiments, the UE 720, (R)AN 708, and AP 712 may be configured to utilize LWA operation and/or LWIP operation. The LWA operation may involve the UE 720 in RRC_CONNECTED being configured by the RAN node 714 or the RAN node 716 to utilize radio resources of LTE and WLAN. LWIP operation may involve the UE 720 using WLAN radio resources (e.g., connection 724) via IPsec protocol tunneling to authenticate and encrypt packets (e.g., IP packets) sent over the connection 724. IPsec tunneling may include encapsulating the entirety of original IP packets and adding a new packet header, thereby protecting the original header of the IP packets.

The (R)AN 708 can include one or more AN nodes, such as RAN node 714 and RAN node 716, that enable the connection 704 and connection 702. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or 5G system (for example, a gNB), and the term "E-UTRAN node" or the like may refer to a RAN node that operates in an LTE or 4G system 700 (e.g., an eNB). According to various embodiments, the RAN node 714 or RAN node 716 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 714 or RAN node 716 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 714 or RAN node 716); a MAC/PHY split wherein RRC, PDCP, RLC, and MAC layers are operated by the CRAN/vBBUP and the PHY layer is operated by individual RAN nodes (e.g., RAN node 714 or RAN node 716); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 714 or RAN node 716 to perform other virtualized applications. In some implementations, an individual RAN node may represent individual gNB-DUs that are connected to a gNB-CU via individual F1 interfaces (not shown by FIG. 7). In these implementations, the gNB-DUs may include one or more remote radio heads or RFEMs, and the gNB-CU may be operated by a server that is located in the (R)AN 708 (not shown) or by a server pool in a similar manner as the CRAN/vBBUP. Additionally, or alternatively, one or more of the RAN node 714 or RAN node 716 may be next generation eNBs (ng-eNBs), which are RAN nodes that provide E-UTRA user plane and control plane protocol terminations toward the UE 722 and UE 720, and are connected to an SGC via an NG interface (discussed infra). In V2X scenarios one or more of the RAN node 714 or RAN node 716 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 714 and/or the RAN node 716 can terminate the air interface protocol and can be the first point of contact for the UE 722 and UE 720. In some embodiments, the RAN node 714 and/or the RAN node 716 can fulfill various logical functions for the (R)AN 708 including, but not limited to, radio network controller (RNC) functions such as radio bearer management, uplink and downlink dynamic radio resource management and data packet scheduling, and mobility management.

In embodiments, the UE 722 and UE 720 can be configured to communicate using OFDM communication signals with each other or with the RAN node 714 and/or the RAN node 716 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 714 and/or the RAN node 716 to the UE 722 and UE 720, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 722 and UE 720 and the RAN node 714 and/or the RAN node 716 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

The PDSCH carries user data and higher-layer signaling to the UE 722 and UE 720. The PDCCH carries information about the transport format and resource allocations related to the PDSCH channel, among other things. It may also inform the UE 722 and UE 720 about the transport format, resource allocation, and HARQ information related to the uplink shared channel. Typically, downlink scheduling (assigning control and shared channel resource blocks to the UE 720 within a cell) may be performed at any of the RAN node 714 or RAN node 716 based on channel quality information fed back from any of the UE 722 and UE 720. The downlink resource assignment information may be sent on the PDCCH used for (e.g., assigned to) each of the UE 722 and UE 720.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 714 or RAN node 716 may be configured to communicate with one another via interface 730. In embodiments where the system 700 is an LTE system (e.g., when CN 706 is an EPC), the interface 730 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 722 from an SeNB for user data; information of PDCP PDUs that were not delivered to a UE 722; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 700 is a 5G or NR system (e.g., when CN 706 is an 5GC), the interface 730 may be an Xn interface. The Xn interface is defined between two or more RAN nodes (e.g., two or more gNBs and the like) that connect to 5GC, between a RAN node 714 (e.g., a gNB) connecting to 5GC and an eNB, and/or between two eNBs connecting to 5GC (e.g., CN 706). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 722 in a connected mode (e.g., CM-CONNECTED) including functionality to manage the UE mobility for connected mode between one or more RAN node 714 or RAN node 716. The mobility support may include context transfer from an old (source) serving RAN node 714 to new (target) serving RAN node 716; and control of user plane tunnels between old (source) serving RAN node 714 to new (target) serving RAN node 716. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 708 is shown to be communicatively coupled to a core network-in this embodiment, CN 706. The CN 706 may comprise one or more network elements 732, which are configured to offer various data and telecommunications services to customers/subscribers (e.g., users of UE 722 and UE 720) who are connected to the CN 706 via the (R)AN 708. The components of the CN 706 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 706 may be referred to as a network slice, and a logical instantiation of a portion of the CN 706 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 718 may be an element offering applications that use IP bearer resources with the core network (e.g., UMTS PS domain, LTE PS data services, etc.). The application server 718 can also be configured to support one or more communication services (e.g., VoIP sessions, PTT sessions, group communication sessions, social networking services, etc.) for the UE 722 and UE 720 via the EPC. The application server 718 may communicate with the CN 706 through an IP communications interface 736.

In embodiments, the CN 706 may be an 5GC, and the (R)AN 116 may be connected with the CN 706 via an NG interface 734. In embodiments, the NG interface 734 may be split into two parts, an NG user plane (NG-U) interface 726, which carries traffic data between the RAN node 714 or RAN node 716 and a UPF, and the S1 control plane (NG-C) interface 728, which is a signaling interface between the RAN node 714 or RAN node 716 and AMFs.

In embodiments, the CN 706 may be a 5G CN, while in other embodiments, the CN 706 may be an EPC). Where CN 706 is an EPC, the (R)AN 116 may be connected with the CN 706 via an S1 interface 734. In embodiments, the S1 interface 734 may be split into two parts, an S1 user plane (S1-U) interface 726, which carries traffic data between the RAN node 714 or RAN node 716 and the S-GW, and the S1-MME interface 728, which is a signaling interface between the RAN node 714 or RAN node 716 and MMEs.

Figure 8:
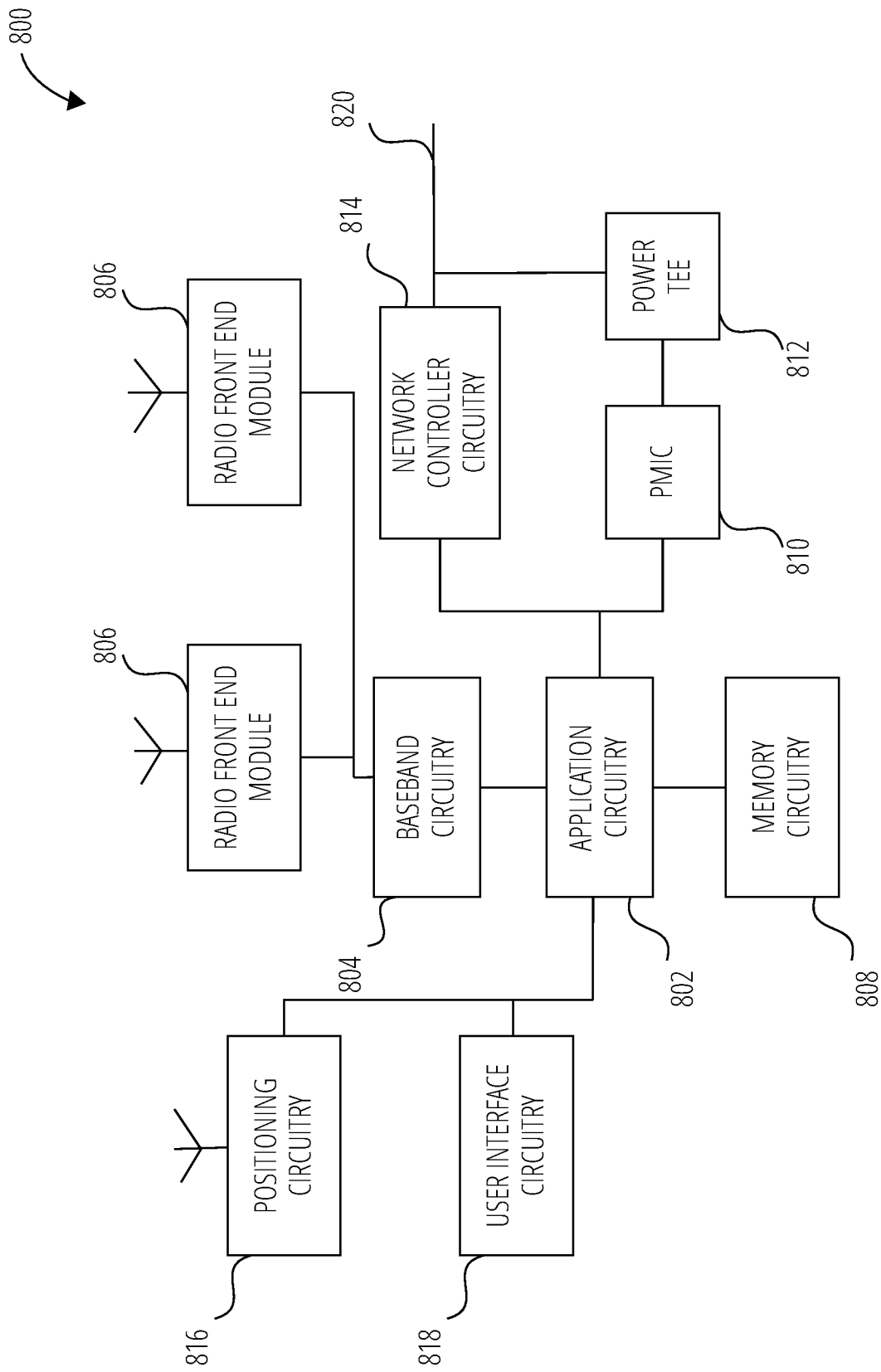
FIG. 8 illustrates an infrastructure equipment in accordance with one embodiment.

FIG. 8 illustrates an example of infrastructure equipment 800 in accordance with various embodiments. The infrastructure equipment 800 may be implemented as a base station, radio head, RAN node, AN, application server, and/or any other element/device discussed herein. In other examples, the infrastructure equipment 800 could be implemented in or by a UE.

The infrastructure equipment 800 includes application circuitry 802, baseband circuitry 804, one or more radio front end module 806 (RFEM), memory circuitry 808, power management integrated circuitry (shown as PMIC 810), power tee circuitry 812, network controller circuitry 814, network interface connector 820, satellite positioning circuitry 816, and user interface circuitry 818. In some embodiments, the device infrastructure equipment 800 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 802 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 802 may be coupled with or may include memory/storage elements and may be configured to execute instructions stored in the memory/storage to enable various applications or operating systems to run on the infrastructure equipment 800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 802 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 802 may comprise, or may be, a special-purpose processor/controller to operate according to the various embodiments herein. As examples, the processor(s) of application circuitry 802 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the infrastructure equipment 800 may not utilize application circuitry 802, and instead may include a special-purpose processor/controller to process IP data received from an EPC or 5GC, for example.

In some implementations, the application circuitry 802 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 802 may comprise logic blocks or logic fabric, and other interconnected resources that may be programmed to perform various functions, such as the procedures, methods, functions, etc. of the various embodiments discussed herein. In such embodiments, the circuitry of application circuitry 802 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like. The baseband circuitry 804 may be implemented, for example, as a solder-down substrate including one or more integrated circuits, a single packaged integrated circuit soldered to a main circuit board or a multi-chip module containing two or more integrated circuits.

The user interface circuitry 818 may include one or more user interfaces designed to enable user interaction with the infrastructure equipment 800 or peripheral component interfaces designed to enable peripheral component interaction with the infrastructure equipment 800. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 806 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 806, which incorporates both mmWave antennas and sub-mmWave.

The memory circuitry 808 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. The memory circuitry 808 may be implemented as one or more of solder down packaged integrated circuits, socketed memory modules and plug-in memory cards.

The PMIC 810 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 812 may provide for electrical power drawn from a network cable to provide both power supply and data connectivity to the infrastructure equipment 800 using a single cable.

The network controller circuitry 814 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 800 via network interface connector 820 using a physical connection, which may be electrical (commonly referred to as a "copper interconnect"), optical, or wireless. The network controller circuitry 814 may include one or more dedicated processors and/or FPGAs to communicate using one or more of the aforementioned protocols. In some implementations, the network controller circuitry 814 may include multiple controllers to provide connectivity to other networks using the same or different protocols.

Figure 9:
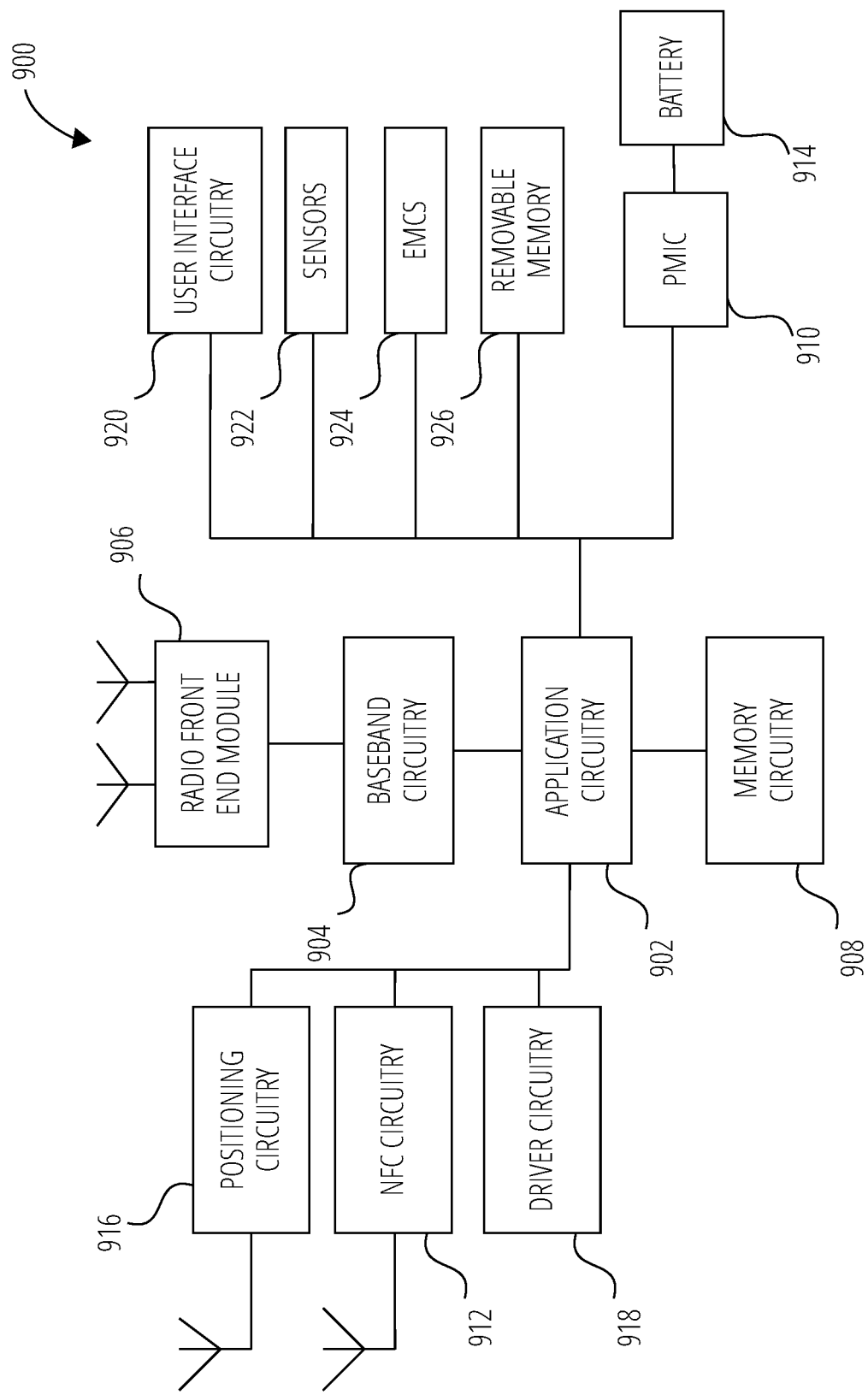
FIG. 9 illustrates a platform in accordance with one embodiment.

FIG. 9 illustrates an example of a platform 900 in accordance with various embodiments. In embodiments, the computer platform 900 may be suitable for use as UEs, application servers, and/or any other element/device discussed herein. The platform 900 may include any combinations of the components shown in the example. The components of platform 900 may be implemented as integrated circuits (ICs), portions thereof, discrete electronic devices, or other modules, logic, hardware, software, firmware, or a combination thereof adapted in the computer platform 900, or as components otherwise incorporated within a chassis of a larger system. The block diagram of FIG. 9 is intended to show a high level view of components of the computer platform 900. However, some of the components shown may be omitted, additional components may be present, and different arrangement of the components shown may occur in other implementations.

Application circuitry 902 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 902 may be coupled with or may include memory/storage elements and may be configured to execute instructions stored in the memory/storage to enable various applications or operating systems to run on the platform 900. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 902 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 902 may comprise, or may be, a special-purpose processor/controller to operate according to the various embodiments herein.

As examples, the processor(s) of application circuitry 902 may include an Intel® Architecture Core™ based processor, such as a Quark™, an Atom™, an i3, an i5, an i7, or an MCU-class processor, or another such processor available from Intel® Corporation. The processors of the application circuitry 902 may also be one or more of Advanced Micro Devices (AMD) Ryzen® processor(s) or Accelerated Processing Units (APUs); AS-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 902 may be a part of a system on a chip (SoC) in which the application circuitry 902 and other components are formed into a single integrated circuit, or a single package, such as the Edison™ or Galileo™ SoC boards from Intel® Corporation.

Additionally or alternatively, application circuitry 902 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 902 may comprise logic blocks or logic fabric, and other interconnected resources that may be programmed to perform various functions, such as the procedures, methods, functions, etc. of the various embodiments discussed herein. In such embodiments, the circuitry of application circuitry 902 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 904 may be implemented, for example, as a solder-down substrate including one or more integrated circuits, a single packaged integrated circuit soldered to a main circuit board or a multi-chip module containing two or more integrated circuits.

The radio front end module 906 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 906, which incorporates both mmWave antennas and sub-mmWave.

The memory circuitry 908 may include any number and type of memory devices used to provide for a given amount of system memory. As examples, the memory circuitry 908 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 908 may be developed in accordance with a Joint Electron Devices Engineering Council (JEDEC) low power double data rate (LPDDR)-based design, such as LPDDR2, LPDDR3, LPDDR4, or the like. Memory circuitry 908 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 908 maybe on-die memory or registers associated with the application circuitry 902. To provide for persistent storage of information such as data, applications, operating systems and so forth, memory circuitry 908 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 900 may incorporate the three-dimensional (3D) cross-point (XPOINT) memories from Intel® and Micron®.

The removable memory 926 may include devices, circuitry, enclosures/housings, ports or receptacles, etc. used to couple portable data storage devices with the platform 900. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 900 may also include interface circuitry (not shown) that is used to connect external devices with the platform 900. The external devices connected to the platform 900 via the interface circuitry include sensors 922 and electro-mechanical components (shown as EMCs 924), as well as removable memory devices coupled to removable memory 926.

The sensors 922 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 924 include devices, modules, or subsystems whose purpose is to enable platform 900 to change its state, position, and/or orientation, or move or control a mechanism or (sub)system. Additionally, EMCs 924 may be configured to generate and send messages/signaling to other components of the platform 900 to indicate a current state of the EMCs 924. Examples of the EMCs 924 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 900 is configured to operate one or more EMCs 924 based on one or more captured events and/or instructions or control signals received from a service provider and/or various clients. In some implementations, the interface circuitry may connect the platform 900 with positioning circuitry 916. The positioning circuitry 916 includes circuitry to receive and decode signals transmitted/broadcasted by a positioning network.

In some implementations, the interface circuitry may connect the platform 900 with Near-Field Communication circuitry (shown as NFC circuitry 912). The NFC circuitry 912 is configured to provide contactless, short-range communications based on radio frequency identification (RFID) standards, wherein magnetic field induction is used to enable communication between NFC circuitry 912 and NFC-enabled devices external to the platform 900 (e.g., an "NFC touchpoint"). NFC circuitry 912 comprises an NFC controller coupled with an antenna element and a processor coupled with the NFC controller. The NFC controller may be a chip/IC providing NFC functionalities to the NFC circuitry 912 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 912, or initiate data transfer between the NFC circuitry 912 and another active NFC device (e.g., a smartphone or an NFC-enabled POS terminal) that is proximate to the platform 900.

The driver circuitry 918 may include software and hardware elements that operate to control particular devices that are embedded in the platform 900, attached to the platform 900, or otherwise communicatively coupled with the platform 900. The driver circuitry 918 may include individual drivers allowing other components of the platform 900 to interact with or control various input/output (I/O) devices that may be present within, or connected to, the platform 900. For example, driver circuitry 918 may include a display driver to control and allow access to a display device, a touchscreen driver to control and allow access to a touchscreen interface of the platform 900, sensor drivers to obtain sensor readings of sensors 922 and control and allow access to sensors 922, EMC drivers to obtain actuator positions of the EMCs 924 and/or control and allow access to the EMCs 924, a camera driver to control and allow access to an embedded image capture device, audio drivers to control and allow access to one or more audio devices.

The power management integrated circuitry (shown as PMIC 910) (also referred to as "power management circuitry") may manage power provided to various components of the platform 900. In particular, with respect to the baseband circuitry 904, the PMIC 910 may control power-source selection, voltage scaling, battery charging, or DC-to-DC conversion. The PMIC 910 may often be included when the platform 900 is capable of being powered by a battery 914, for example, when the device is included in a UE.

In some embodiments, the PMIC 910 may control, or otherwise be part of, various power saving mechanisms of the platform 900. For example, if the platform 900 is in an RRC_Connected state, where it is still connected to the RAN node as it expects to receive traffic shortly, then it may enter a state known as Discontinuous Reception Mode (DRX) after a period of inactivity. During this state, the platform 900 may power down for brief intervals of time and thus save power. If there is no data traffic activity for an extended period of time, then the platform 900 may transition off to an RRC Idle state, where it disconnects from the network and does not perform operations such as channel quality feedback, handover, etc. The platform 900 goes into a very low power state and it performs paging where again it periodically wakes up to listen to the network and then powers down again. The platform 900 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 914 may power the platform 900, although in some examples the platform 900 may be mounted deployed in a fixed location, and may have a power supply coupled to an electrical grid. The battery 914 may be a lithium ion battery, a metal-air battery, such as a zinc-air battery, an aluminum-air battery, a lithium-air battery, and the like. In some implementations, such as in V2X applications, the battery 914 may be a typical lead-acid automotive battery.

In some implementations, the battery 914 may be a "smart battery," which includes or is coupled with a Battery Management System (BMS) or battery monitoring integrated circuitry. The BMS may be included in the platform 900 to track the state of charge (SoCh) of the battery 914. The BMS may be used to monitor other parameters of the battery 914 to provide failure predictions, such as the state of health (SoH) and the state of function (SoF) of the battery 914. The BMS may communicate the information of the battery 914 to the application circuitry 902 or other components of the platform 900. The BMS may also include an analog-to-digital (ADC) convertor that allows the application circuitry 902 to directly monitor the voltage of the battery 914 or the current flow from the battery 914. The battery parameters may be used to determine actions that the platform 900 may perform, such as transmission frequency, network operation, sensing frequency, and the like.

A power block, or other power supply coupled to an electrical grid may be coupled with the BMS to charge the battery 914. In some examples, the power block may be replaced with a wireless power receiver to obtain the power wirelessly, for example, through a loop antenna in the computer platform 900. In these examples, a wireless battery charging circuit may be included in the BMS. The specific charging circuits chosen may depend on the size of the battery 914, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 920 includes various input/output (I/O) devices present within, or connected to, the platform 900, and includes one or more user interfaces designed to enable user interaction with the platform 900 and/or peripheral component interfaces designed to enable peripheral component interaction with the platform 900. The user interface circuitry 920 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 900. The output device circuitry may also include speakers or other audio emitting devices, printer(s), and/or the like. In some embodiments, the sensors 922 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 900 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I$^2$C interface, an SPI interface, point-to-point interfaces, and a power bus, among others.

Figure 10:
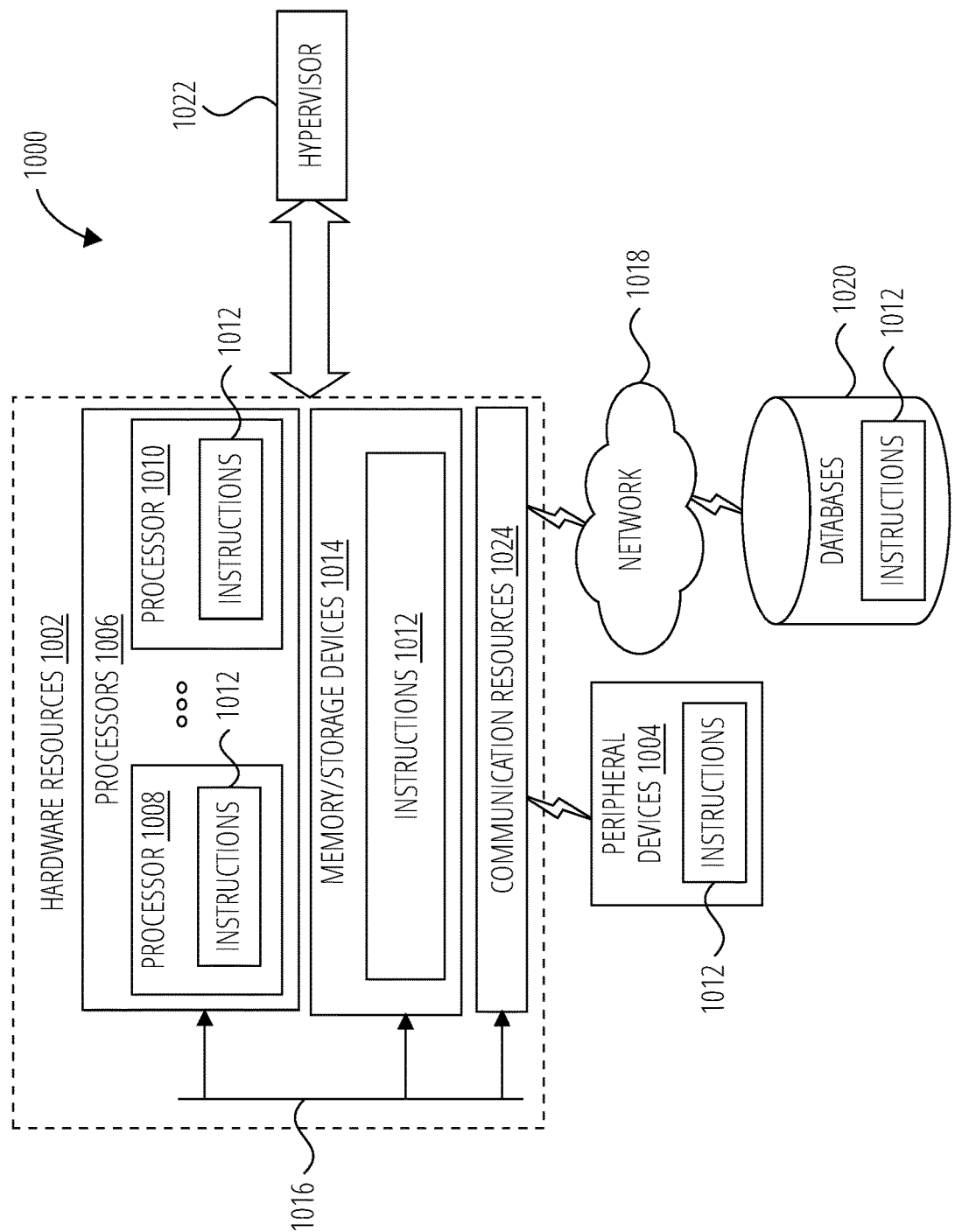
FIG. 10 illustrates components in accordance with one embodiment.

FIG. 10 is a block diagram illustrating components 1000, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1002 including one or more processors 1006 (or processor cores), one or more memory/storage devices 1014, and one or more communication resources 1024, each of which may be communicatively coupled via a bus 1016. For embodiments where node virtualization (e.g., NFV) is utilized, a hypervisor 1022 may be executed to provide an execution environment for one or more network slices/sub-slices to utilize the hardware resources 1002.

The processors 1006 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1008 and a processor 1010.

The memory/storage devices 1014 may include main memory, disk storage, or any suitable combination thereof. The memory/storage devices 1014 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1024 may include interconnection or network interface components or other suitable devices to communicate with one or more peripheral devices 1004 or one or more databases 1020 via a network 1018. For example, the communication resources 1024 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1012 may comprise software, a program, an application, an applet, an app, or other executable code for causing at least any of the processors 1006 to perform any one or more of the methodologies discussed herein. The instructions 1012 may reside, completely or partially, within at least one of the processors 1006 (e.g., within the processor's cache memory), the memory/storage devices 1014, or any suitable combination thereof. Furthermore, any portion of the instructions 1012 may be transferred to the hardware resources 1002 from any combination of the peripheral devices 1004 or the databases 1020. Accordingly, the memory of the processors 1006, the memory/storage devices 1014, the peripheral devices 1004, and the databases 1020 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 may include an apparatus comprising means to perform one or more elements of a method described in or related to any of the above embodiments, or any other method or process described herein.

Example 2 may include one or more non-transitory computer-readable media comprising instructions to cause an electronic device, upon execution of the instructions by one or more processors of the electronic device, to perform one or more elements of a method described in or related to any of the above embodiments, or any other method or process described herein.

Example 3 may include an apparatus comprising logic, modules, or circuitry to perform one or more elements of a method described in or related to any of the above embodiments, or any other method or process described herein.

Example 4 may include a method, technique, or process as described in or related to any of the above embodiments, or portions or parts thereof.

Example 5 may include an apparatus comprising: one or more processors and one or more computer-readable media comprising instructions that, when executed by the one or more processors, cause the one or more processors to perform the method, techniques, or process as described in or related to any of the above embodiments, or portions thereof.

Example 6 may include a signal as described in or related to any of the above embodiments, or portions or parts thereof.

Example 7 may include a datagram, packet, frame, segment, protocol data unit (PDU), or message as described in or related to any of the above embodiments, or portions or parts thereof, or otherwise described in the present disclosure.

Example 8 may include a signal encoded with data as described in or related to any of the above embodiments, or portions or parts thereof, or otherwise described in the present disclosure.

Example 9 may include a signal encoded with a datagram, packet, frame, segment, PDU, or message as described in or related to any of the above embodiments, or portions or parts thereof, or otherwise described in the present disclosure.

Example 10 may include an electromagnetic signal carrying computer-readable instructions, wherein execution of the computer-readable instructions by one or more processors is to cause the one or more processors to perform the method, techniques, or process as described in or related to any of the above embodiments, or portions thereof.

Example 11 may include a computer program comprising instructions, wherein execution of the program by a processing element is to cause the processing element to carry out the method, techniques, or process as described in or related to any of the above embodiments, or portions thereof.

Example 12 may include a signal in a wireless network as shown and described herein.

Example 13 may include a method of communicating in a wireless network as shown and described herein.

Example 14 may include a system for providing wireless communication as shown and described herein.

Example 15 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed.

Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a first user equipment (UE) to perform channel state information (CSI) feedback in coordination with one or more second UE, the method comprising:
 processing configuration information from a wireless network to configure the first UE for CSI measurement and reporting;
 measuring, based on the configuration information, CSI reference signal (CSI-RS) resources to determine first CSI;
 in response to a CSI report trigger for a coordination group comprising the first UE and the one or more second UE, transmitting a first CSI report to the wireless network for the coordination group, the first CSI report comprising at least the first CSI; and
 coordinating with the one or more second UE to receive a second CSI from the one or more second UE in the coordination group, wherein the first CSI report comprises the first CSI for the first UE and the second CSI for the one or more second UE.

2. The method of claim 1, further comprising sending a message to the wireless network indicating a supported mode for UE coordination based CSI feedback, wherein in a first mode both the first UE and the one or more second UE perform CSI measurements to be reported by the first UE, and wherein in a second mode only the first UE performs the CSI measurements to be reported by the first UE.

3. The method of claim 1, wherein the CSI report trigger corresponds to one or more CSI report configuration information element (CSI-reportConfig IE) associated with at least one of the first UE and the one or more second UE.

4. The method of claim 3, wherein control signaling from the wireless network for the CSI report trigger comprises a UE identifier (ID) and a CSI-reportConfig ID for each of the one or more CSI-reportConfig IE to be reported.

5. The method of claim 4, further comprising multiplexing the first CSI and the second CSI in the first CSI report based on the UE ID and the CSI-reportConfig ID.

6. The method of claim 3, wherein each of the one or more CSI-reportConfig IE comprises a UE identifier (ID), and wherein control signaling from the wireless network for the CSI report trigger comprises a CSI-reportConfig ID for each of the one or more CSI-reportConfig IE to be reported.

7. The method of claim 1, wherein the CSI report trigger comprises a radio resource control (RRC) signal, a media access control (MAC) control element (CE), or downlink control information (DCI) transmitted to the first UE, transmitted separately to the first UE and the one or more second UE, or transmitted to the first UE and the one or more second UE in a group based manner.

8. The method of claim 1, wherein the first UE comprises a maximum number of receive (Rx) antennas for the coordination group.

9. The method of claim 8, wherein the configuration information comprises a CSI report configuration information element (CSI-reportConfig IE) comprising UE identifiers (IDs) for each of the first UE and the one or more second UE, wherein a rank restriction is configured per UE, wherein the first CSI is based on measuring the CSI-RS resources by the first UE using the maximum number of Rx antennas, and wherein the first CSI report comprises the first CSI for the first UE and any of the one or more second UE comprising the maximum number of Rx antennas.

10. The method of claim 9, further comprising:
 determining, by the first UE, a third CSI based on measuring the CSI-RS resources using a subset of Rx antennas that is less than the maximum number of Rx antennas; and
 transmitting a second CSI report to the wireless network comprising the third CSI for at least one of the one or more second UE comprising a number of Rx antennas corresponding to the subset of Rx antennas.

11. The method of claim 10, wherein the subset of Rx antennas comprises a predetermined subset of Rx antennas of the first UE, a selected subset of Rx antennas of the first UE determined by the first UE, or an indicated subset of Rx antennas determined by the wireless network.

12. The method of claim 10, wherein the subset of Rx antennas comprises a best subset of Rx antennas or a worst subset of Rx antennas as measured by the first UE.

13. The method of claim 8, wherein the configuration information comprises a CSI report configuration information element (CSI-reportConfig IE) indicating one or more maximum number of downlink (DL) layers for reporting, wherein the maximum number of DL layers implies a number of Rx antennas per UE, and wherein a rank restriction is configured per the maximum number of DL layers.

14. The method of claim 13, further comprising reporting the first CSI for a first maximum number of DL layers and a third CSI for a second maximum number of DL layers.

15. The method of claim 14, wherein the second maximum number of DL layers corresponds to a predetermined subset of Rx antennas of the first UE, a selected subset of Rx antennas of the first UE determined by the first UE, or an indicated subset of Rx antennas of the first UE determined by the wireless network.

16. The method of claim 14, wherein the second maximum number of DL layers corresponds to a best subset of Rx antennas or a worst subset of Rx antennas as measured by the first UE.

17. The method of claim 8, wherein the configuration information comprises a CSI report configuration information element (CSI-reportConfig IE) configured for a single UE or for multiple UEs in the coordination group, wherein a rank restriction is configured per a maximum number of DL layers.

18. The method of claim 17, further comprising reporting the first CSI for a first maximum number of DL layers and a third CSI for a second maximum number of DL layers.

19. The method of claim 18, wherein the second maximum number of DL layers corresponds to a predetermined subset of Rx antennas of the first UE, a selected subset of Rx antennas of the first UE determined by the first UE, or an indicated subset of Rx antennas of the first UE determined by the wireless network.

* * * * *